Nov. 5, 1935. T. NOBLE 2,019,926
DISTRIBUTOR HEAD FOR PNEUMATIC CONVEYERS
Filed Feb. 5, 1935 2 Sheets-Sheet 1

Inventor
Thomas Noble
By Clarence A. O'Brien
Attorney

Inventor
Thomas Noble
By Clarence A. O'Brien
Attorney

UNITED STATES PATENT OFFICE 2,019,926

DISTRIBUTOR HEAD FOR PNEUMATIC CONVEYERS

Thomas Noble, Mount Carroll, Ill.

Application February 5, 1935, Serial No. 5,128

5 Claims. (Cl. 302—10)

This invention relates to a distributing head for pneumatic conveyers and particularly blower pipes on agricultural machines.

One of the objects of the invention is to provide a distributor head of the character referred to that is capable of controlling the material being discharged such as, seed hulls, straw grain, ensilage etc. from the blower pipes.

Another feature of the invention is the installation of a distributing blade in the path of the discharged material so as to concentrate the stream instead of allowing it to scatter broadcast as results from discharging the material directly from the end of a blow pipe.

Another feature of the present invention is to provide a deflector plate so as to control the direction of the material being deposited.

Further objects of the invention are to provide a device of the character referred to that is strong, compact and durable, thoroughly reliable for its intended purpose, very efficient in operation, and comparatively inexpensive to manufacture and install on the conventional discharge end of a blower pipe.

With the foregoing and other objects in view, the invention consists of a novel construction, combination and arrangement of parts as will be hereinafter more specifically described and illustrated in the accompanying drawings wherein is disclosed an embodiment of the invention, but it is to be understood that changes, modifications and variations may be resorted to without departing from the spirit of the claims hereunto appended.

In the drawings wherein like reference characters denote corresponding parts throughout the several views.

Figure 1:
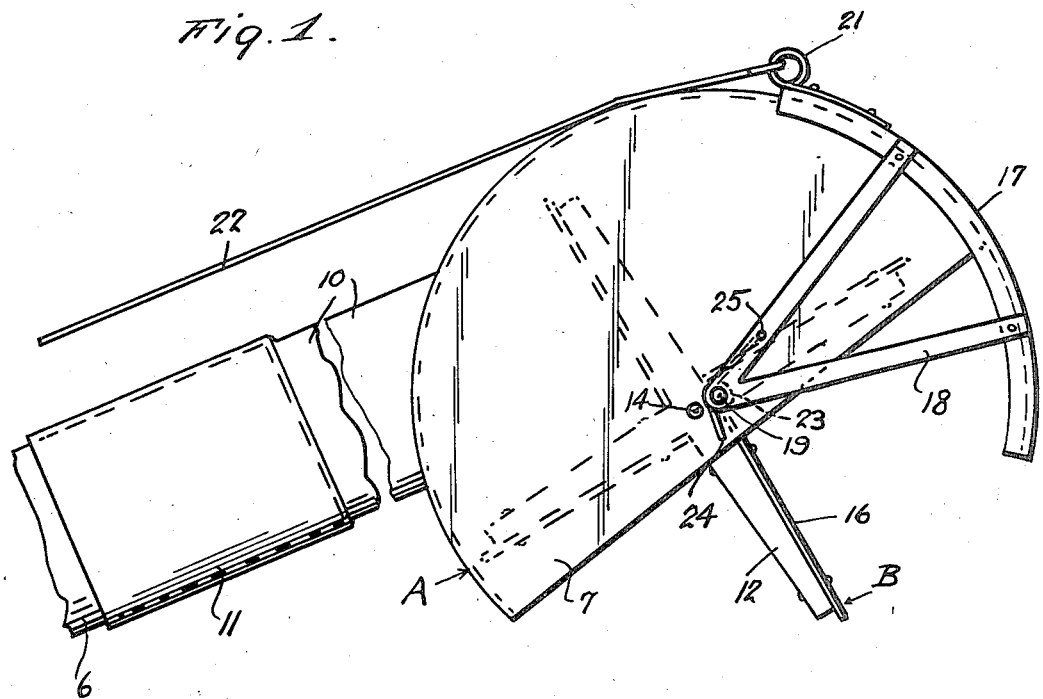
Figure 1 is a side elevation of an outer end of a pneumatic conveyer blower pipe showing an adaption therewith of the device in accordance with the present invention in fragmentary side elevation.
Figure 2:
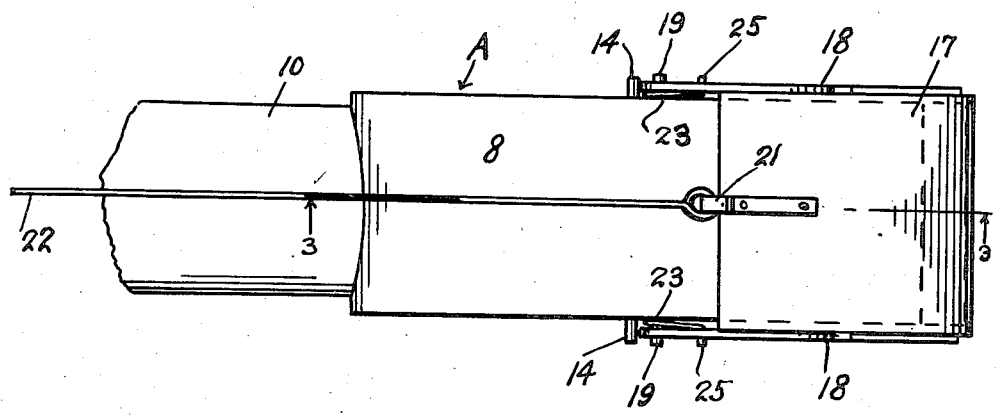
Figure 2 is a top plan view thereof.
Figure 3:
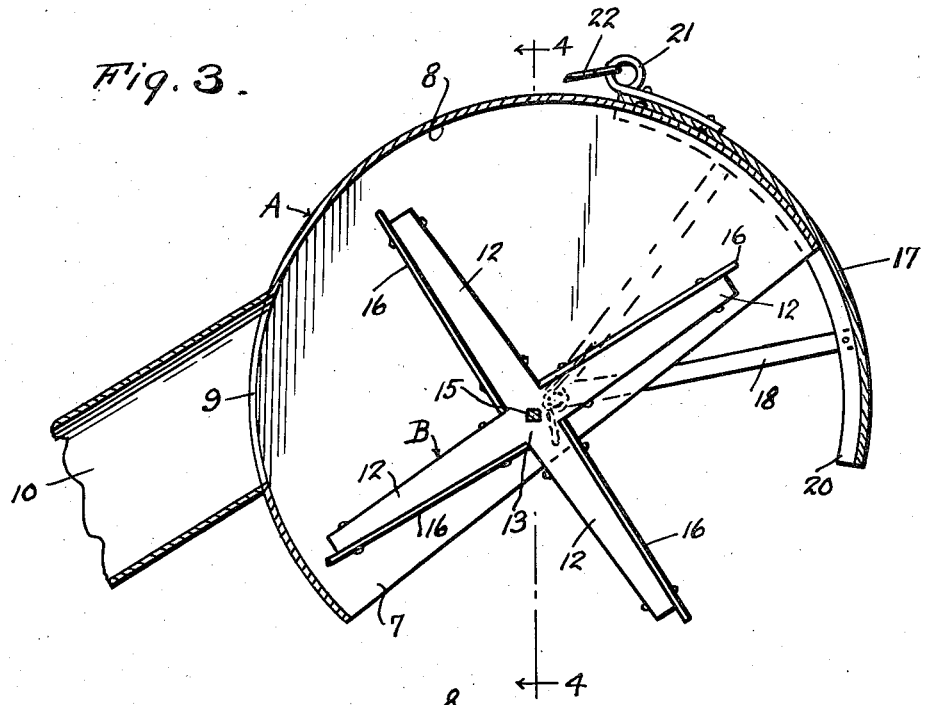
Figure 3 is a detailed vertical section through the hood and showing the distributing reel in side elevation.
Figure 4:
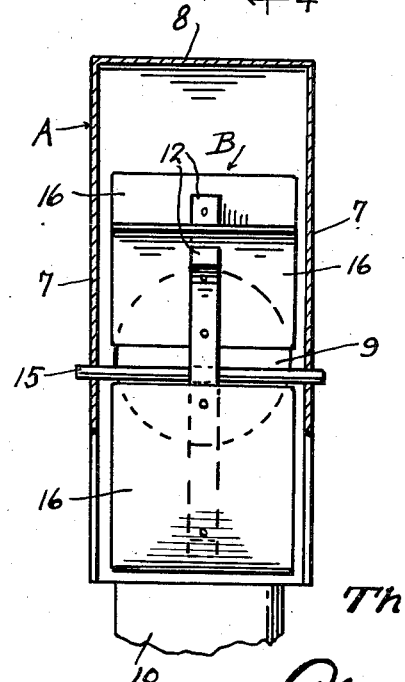
Figure 4 is a detailed vertical section taken substantially on line 4—4 of Figure 3 and looking in the direction of the arrows.

Referring to the drawings in detail wherein is disclosed the preferred embodiment of the invention, 6 indicates the discharge end of a blower pipe of a pneumatic conveyer (not shown). A indicates the hood that muffles the stream of material being discharged from the blower pipe 6. This hood is segmental in shape and formed with opposed semi-circular side walls 7 spaced from each other and joined along their circumferential edges with the arcuate wall 8 of the hood. Extending rearward from the hood A and registering with an opening 9 in the arcuate wall 8 is a pipe 10 formed at its rear end with a collar 11 that has a sliding fit with the outer end of blower pipe 6. The pipe 10 registers with the interior of the hood A and enters at a point substantially tangential with the arcuate wall 8.

Slightly more than half of the reel indicated at B is confined within the chamber of the hood. The hood is open along the side of the segment which would be represented by a chord. The reel B consists of four spokes 12 radiating from a hub 13 through which extends the shaft 14 and the ends of the shaft are journalled in the opposed side wall 7 as at 15. On the spokes 12 are secured flat blades 16 which extend across the interior of the hood and lie in the path of the opening 9 through which the material such as straw, ensilage, grain or the like is discharged into the hood. When the material strikes the blades, the reel revolves and in revolving will deposit the material at the same point through the opening in the hood, whereas in discharging material through the unmodified end of a blower pipe it is scattered broadcast and difficult to pile.

For the additional control of the material being deposited through the opening in the hood, I provide an arcuate deflector plate 17 of substantially the same curvature as the arcuate wall 8 of the hood and this deflector plate is carried by opposed V-shaped brackets 18, the apices of which are pivoted the trunnions 19 on the lower portion of the side wall 7 of the hood. On the opposed edges of the arcuate deflector plate 17 there are depending flanges 20 that overhang the side wall 7 of the hood, while the plate rides over the arcuate wall 8 of the hood. On the rear of the arcuate deflector plate 17 is secured an eye 21 to which the forward end of a cable 22 leading from a remote point where the operator controls the pneumatic conveyer is attached to the eye.

By adjusting the cable 22 from the aforesaid remote point, the deflector plate 17 may be raised from across the opening in the hood to further control the deposit of the material from the end of the blower pipe.

Any projectile force mechanism may be used to normally project the deflector plate so that the operator at a remote point may regulate the opening in the hood by pulling cable 22 against the projectile force and making the cable fast or holding it in his hands. As a means of supplying the projectile force to the deflector plate, I provide a pair of coil springs 23 which embrace each trunnion 19 and have one end secured to the brackets 18 as at 25 and the other end to the wall 7 of the hood as at 24 whereby the deflector plate 17 is normally urged across the opening in the hood, but may be regulated by pulling rearwardly on the cable 22.

Having described the invention, what is claimed as new is:

1. In a pneumatic conveyer, the combination with the discharge end of a blower pipe of a hood over the end of the blower pipe, revolving blades in the hood lying in the path of the material being discharged from the blower pipe, and a deflector plate rockable on the hood overlapping one wall thereof in a certain position and forming an extension of said wall in another position for varying the opening therein.

2. A blower pipe attachment comprising a hood, an extension pipe communicating with the inside of the hood and connected thereto and said pipe being adapted for connection to the discharge end of a blower pipe of a pneumatic conveyer, a revolving distributor reel mounted in the hood, and a deflector plate rockable on the hood across the path of the material being discharged therefrom, said deflector plate overlapping one wall of the casing in a certain position and forming an extension of said one wall in another position for varying the opening in the hood.

3. A blower pipe attachment comprising a hood, an extension pipe communicating with the inside of the hood and connected thereto and said pipe being adapted for connection to the discharge end of a blower pipe of a pneumatic conveyer, a revolving distributor reel mounted in the hood, a deflector plate rockable on the hood across the path of the material being discharged therefrom, and said hood being segmental in shape and open across the chord side.

4. A blower pipe attachment comprising a hood, an extension pipe communicating with the inside of the hood and connected thereto and said pipe being adapted for connection on its free end to the blower pipe of a pneumatic conveyer, a revolving distributor reel mounted in the hood, a deflector plate rockable on the hood across the path of the material being discharged therefrom, said hood being segmental in shape, and said pipe joining the interior of the hood substantially tangential with the arcuate wall thereof.

5. In a pneumatic conveyer, the combination with the discharge end of a blower pipe of a segmental-shaped hood over the end of the blower pipe open on the chord side thereof, revolving blades in the hood lying in the path of the material being discharged from the blower pipe, and a curved deflector plate rockably mounted on the hood overlapping one wall thereof in a certain position and forming an extension of said wall in another position for varying the opening therein.

THOMAS NOBLE.